United States Patent
Yamashita

(10) Patent No.: US 12,445,716 B2
(45) Date of Patent: Oct. 14, 2025

(54) INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Shunki Yamashita, Kanagawa (JP)

(73) Assignee: Canon Kabushiki Kaisha, Tokyo (JP)

(*) Notice: Subject to any disclaimer, the term of this patent is extended or adjusted under 35 U.S.C. 154(b) by 122 days.

(21) Appl. No.: 18/346,048

(22) Filed: Jun. 30, 2023

(65) Prior Publication Data

US 2024/0015391 A1    Jan. 11, 2024

(30) Foreign Application Priority Data

Jul. 5, 2022    (JP) .................. 2022-108514

(51) Int. Cl.
*H04N 23/63* (2023.01)
*H04N 23/695* (2023.01)

(52) U.S. Cl.
CPC ......... *H04N 23/635* (2023.01); *H04N 23/632* (2023.01); *H04N 23/695* (2023.01)

(58) Field of Classification Search
CPC .. H04N 23/635; H04N 23/632; H04N 23/695; H04N 23/61; H04N 23/631; H04N 23/634; H04N 23/69; H04N 23/661
See application file for complete search history.

(56) References Cited

U.S. PATENT DOCUMENTS

2010/0149400 A1* 6/2010 Sugino ................. H04N 23/73
                                                           348/E5.022
2018/0017659 A1* 1/2018 Irie ..................... G01S 3/7864

FOREIGN PATENT DOCUMENTS

JP          2014039166 A1    2/2014

* cited by examiner

*Primary Examiner* — Yogesh K Aggarwal
(74) *Attorney, Agent, or Firm* — Canon U.S.A., Inc., IP Division

(57) ABSTRACT

An information processing apparatus includes a hardware processor, and a memory for storing instructions to be executed by the hardware processor, wherein, when the instructions stored in the memory are executed by the hardware processor, the information processing apparatus functions as: a generation unit configured to generate a window that corresponds to an image capture range of an image capture unit and includes an icon to be used to determine a composition in tracking a target subject to be tracked, and a correction unit configured to correct, in a case where a position of an icon designated by a user operation in a state where the window is displayed is included in a tracking lost area calculated based on a size of the icon, the position of the icon not to include the position of the icon in the tracking lost area.

11 Claims, 13 Drawing Sheets

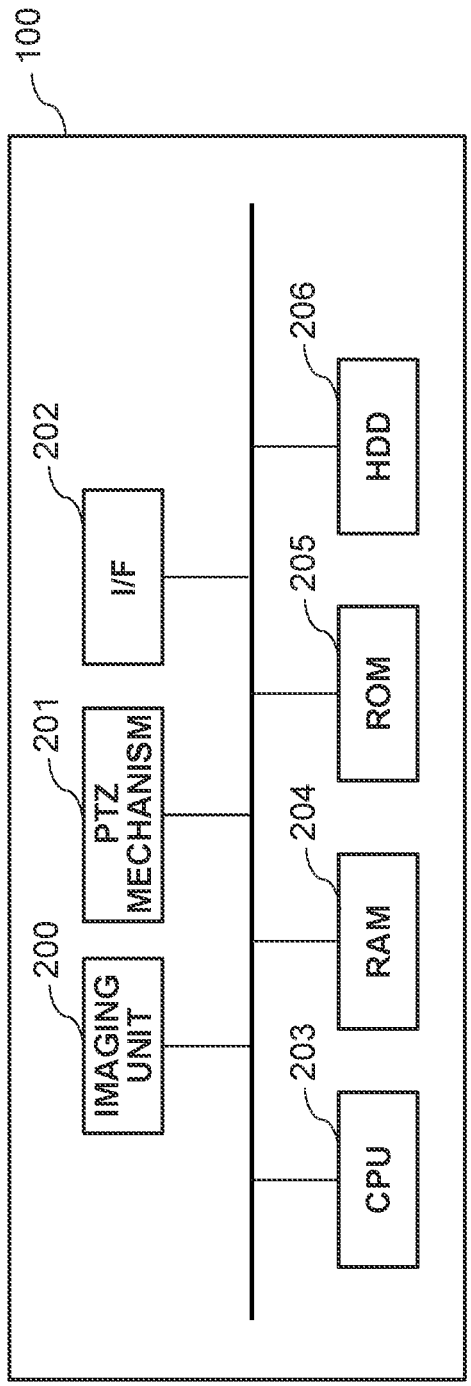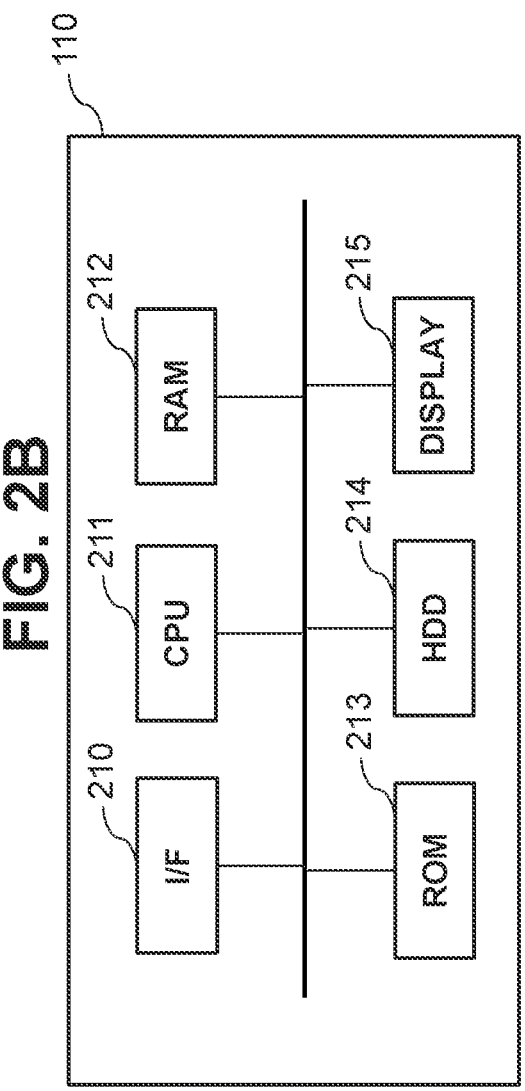

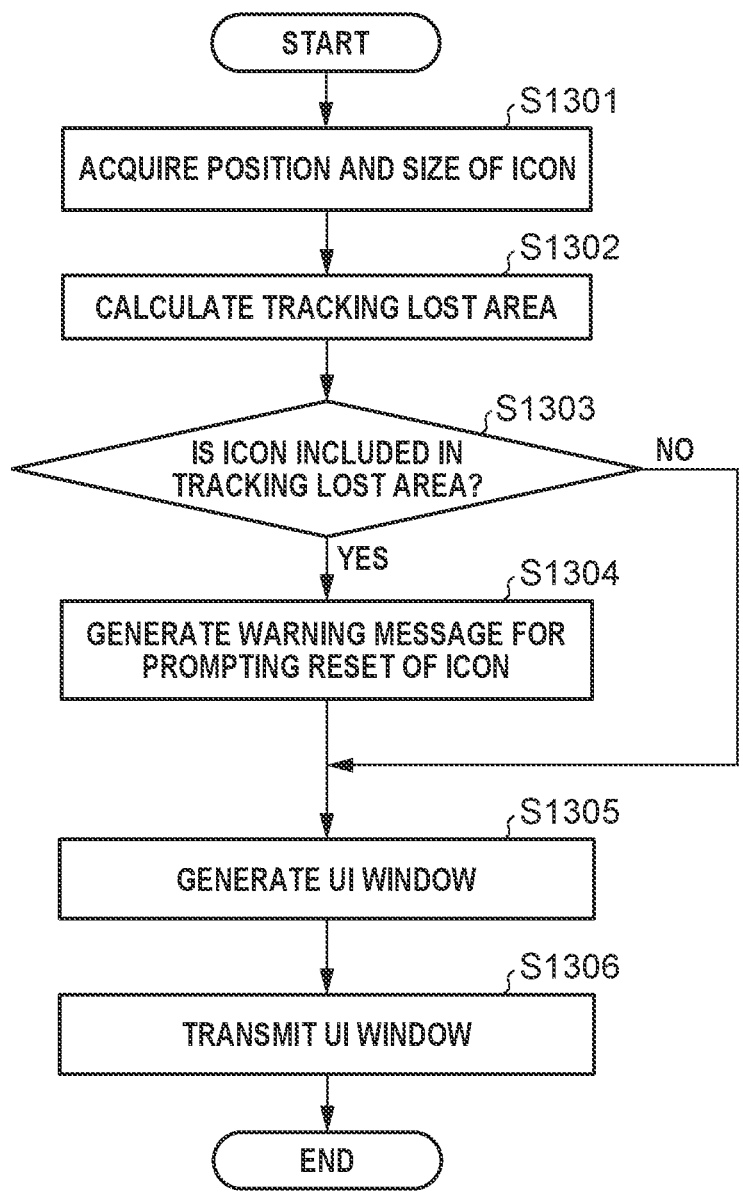

INFORMATION PROCESSING APPARATUS, INFORMATION PROCESSING METHOD, AND STORAGE MEDIUM

BACKGROUND

Field

The present disclosure relates to an information processing technique.

Description of the Related Art

There has been an automatic tracking function that detects a subject included in an image picked up by an image capture apparatus, and controls pan/tilt/zoom (PTZ) of the image capture apparatus to keep the detected subject within an image capture range. There is also a technique for setting a position and a size of the subject within the image capture range, in the automatic tracking function.

In Japanese Patent Application Laid-Open No. 2014-39166, a user can set a position at which a subject appears during automatic tracking and a size of the subject, by operating icons displayed for composition/display size setting. In addition, according to Japanese Patent Application Laid-Open No. 2014-39166, when setting the position at which the subject appears during the automatic tracking, the user can set this position only in a predetermined range within a screen.

However, in Japanese Patent Application Laid-Open No. 2014-39166, the range in which the position at which the subject appears during the automatic tracking can be set is uniformly fixed, and the uniformly fixed range can be inappropriate depending on circumstances.

SUMMARY

The present disclosure is directed to providing a technique that enables appropriate setting of a composition during automatic tracking.

To address the above-described issue, an information processing apparatus according to an aspect of the present disclosure includes the following configuration.

According to an aspect of the present disclosure, an information processing apparatus includes a memory storing instructions, and a processor that, upon execution of the stored instructions, is configured to functions as: a generation unit configured to generate a window that corresponds to an image capture range of an image capture unit and includes an icon to be used to determine a composition in tracking a target subject to be tracked, and a correction unit configured to correct, a position of an icon designated by a user in the generated window to not be in a tracking lost area that is calculated based on the size of the designated icon.

According to another aspect of the present disclosure, an information processing apparatus includes a memory storing instructions, and a processor that, upon execution of the stored instructions, is configured to functions as: an acquisition unit configured to acquire information about a position and a size of an icon to be used to determine a composition for tracking a target subject to be tracked, and a generation unit configured to generate a window that corresponds to an image capture range of an image capture unit and includes the icon, wherein, in a case where the position of the icon is included in a tracking lost area calculated based on the size of the icon, the generation unit generates information to be provided as a predetermined warning.

Further features of the present disclosure will become apparent from the following description of exemplary embodiments with reference to the attached drawings.

BRIEF DESCRIPTION OF THE DRAWINGS

FIGS. 2A and 2B illustrate a hardware configuration of an image capture apparatus and a hardware configuration of a client apparatus, respectively.

FIG. 13 is a flowchart illustrating a flow of processing for displaying the warning.

DESCRIPTION OF THE EMBODIMENTS

Figure 1:
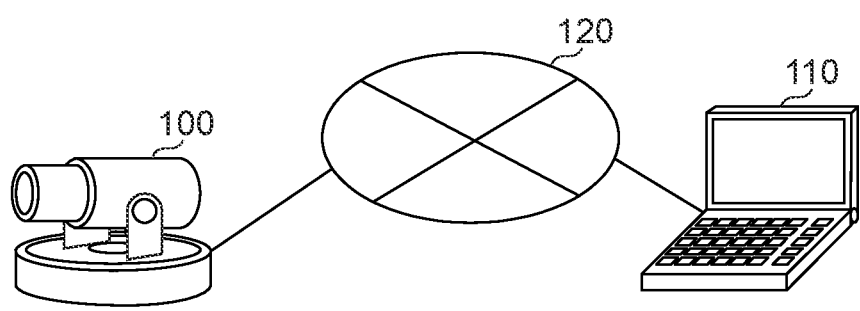
FIG. 1 is a diagram illustrating a system configuration.

Exemplary embodiments according to the present disclosure will be described below with reference to the attached drawings. Configurations described in the following exemplary embodiments are merely examples, and the present disclosure is not limited to the configurations illustrated in the drawings.

FIG. 1 is a diagram illustrating a configuration of a system according to a first exemplary embodiment. The system in the present exemplary embodiment includes an image capture apparatus 100, a client apparatus 110, and a network 120. The image capture apparatus 100 and the client apparatus 110 are interconnected via the network 120. The network 120 includes a plurality of routers, switches, and cables compliant with communication standards such as Ethernet®. The network 120 may also be the Internet, a wired local area network (LAN), a wireless LAN, and/or a wide area network (WAN).

The image capture apparatus 100 can capture an image and deliver this image to the client apparatus 110, and functions as an information processing apparatus. The client apparatus 110 is, for example, a personal computer having a processor such as a central processing unit (CPU).

Here, a hardware configuration of the image capture apparatus 100 will be described with reference to FIG. 2A. The image capture apparatus 100 is an apparatus having a hardware configuration illustrated in FIG. 2A. The image capture apparatus 100 includes an imaging unit 200 that picks up an image, and also includes a pan/tilt/zoom (PTZ) mechanism 201 that is a mechanism for driving pan, tilt, and zoom. The image capture apparatus 100 controls the PTZ of the image capture apparatus 100 by controlling the PTZ mechanism 201, so that an image capture range can be changed.

An interface (I/F) 202 communicates with an external apparatus via the network 120, in conformity with the Transmission Control/Internet Control (TCP/IP), the Hypertext Transfer Protocol (HTTP), and the like. A CPU 203 comprehensively controls the image capture apparatus 100. A random access memory (RAM) 204 temporarily stores a computer program to be executed by the CPU 203. In addition, the RAM 204 provides a work area to be used by the CPU 203 when the CPU 203 executes processing. Further, for example, the RAM 204 can function as a frame memory or as a buffer memory. A read only memory (ROM) 205 stores a program for the CPU 203 to control the image capture apparatus 100. A hard disk drive (HDD) 206 is a storage device that stores image data.

The client apparatus 110 has a hardware configuration illustrated in FIG. 2B. An I/F 210 communicates with an external apparatus via the network 120, in conformity with the TCP/IP, the HTTP, and the like. A CPU 211 comprehensively controls the client apparatus 110. A RAM 212 temporarily stores a computer program to be executed by the CPU 211. In addition, the RAM 212 provides a work area that the CPU 211 uses when executing processing. Further, for example, the RAM 212 can function as a frame memory or as a buffer memory. A ROM 213 stores a program for the CPU 211 to control the client apparatus 110. An HDD 214 is a storage device that stores image data. A display 215 is configured of a liquid crystal display (LCD) or the like, and displays an image transmitted from the image capture apparatus 100, a user interface (UI) window to be described below, and the like. In the present exemplary embodiment, an example in which the client apparatus 110 includes the display 215 is described, but the present exemplary embodiment is not limited thereto, and the client apparatus 110 and the display 215 may be in the respective separate housings.

Figure 3:
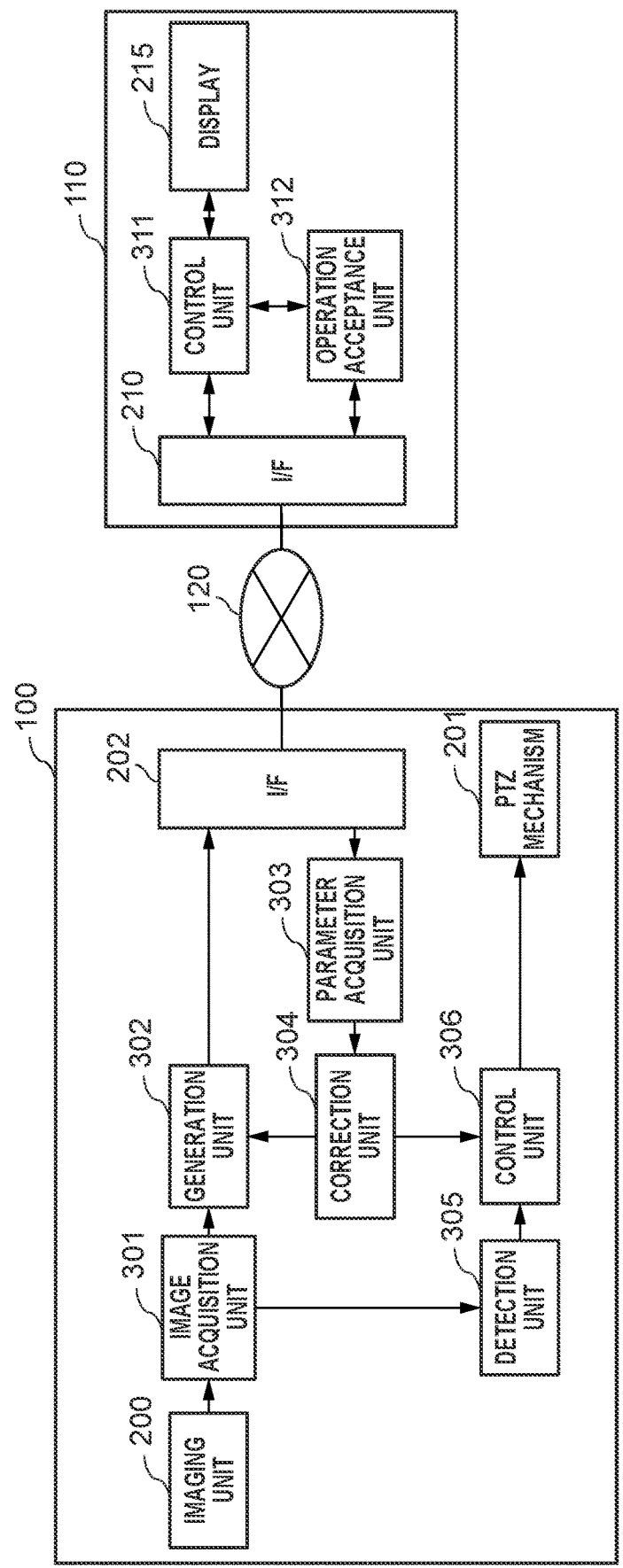
FIG. 3 is a diagram illustrating functional blocks of the image capture apparatus and the client apparatus.

Each function of the image capture apparatus 100 and the client apparatus 110 will be described with reference to functional blocks illustrated in FIG. 3. FIG. 3 illustrates an image acquisition unit 301, a generation unit 302, a parameter acquisition unit 303, a correction unit 304, a detection unit 305, and a control unit 306 as functions, and, for example, the CPU 203 executes a computer program stored in the ROM 205 of the image capture apparatus 100, so that each of the functions is implemented. FIG. 3 further illustrates a control unit 311 and an operation acceptance unit 312 as functions, and, for example, the CPU 211 executes a computer program stored in the ROM 213 of the client apparatus 110, so that each of the functions is implemented.

The image acquisition unit 301 acquires an image picked up by the imaging unit 200. Further, the image acquisition unit 301 outputs the acquired image to the generation unit 302 and the detection unit 305.

The generation unit 302 generates a UI window to be displayed on a display. The UI window generated by the generation unit 302 is used by the user to set parameters for automatic tracking. The details of the UI window will be described below. Further, the generation unit 302 transmits information about the generated UI window to the client apparatus 110 via the I/F 202. The I/F 202 receives tracking setting parameters transmitted from the client apparatus 110 and outputs the received tracking setting parameters to the parameter acquisition unit 303. The tracking setting parameters are parameters for determining the composition of a subject during the automatic tracking, and include information about the position and the size of an icon for determining the composition of a target subject to be tracked. The details of the tracking setting parameters will be described below.

The parameter acquisition unit 303 acquires the position and the size of the icon from the tracking setting parameters input from the I/F 202, and outputs the acquired position and size to the correction unit 304. In a case where setting values indicating the position and the size of the icon indicate a high possibility that tracking is lost, the correction unit 304 corrects the setting values to values for lowering the possibility that tracking is lost, and outputs the corrected setting values to the generation unit 302 and the control unit 306. In a case where setting values indicating the position and the size of the icon do not indicate a high possibility that tracking is lost, the correction unit 304 outputs the setting values to the generation unit 302 and the control unit 306, without correcting the setting values. The details of the processing by the correction unit 304 will be described below.

The detection unit 305 detects a target subject to be tracked from the image input from the image acquisition unit 301, and outputs information about the position and the size of the subject in the image to the control unit 306. For example, a detection technique by deep learning such as a single-shot detector (SSD) or a detection technique by pattern matching can be used to detect the subject. The position of the subject in the image is indicated by X and Y coordinates of the upper left vertex of the circumscribing rectangle of the subject. The size of the subject in the image is indicated by the width and the height of the circumscribing rectangle of the subject.

The control unit 306 calculates PTZ control values, based on the position and the size of the icon input from the correction unit 304, and the position and the size of the subject in the image input from the detection unit 305. The control unit 306 controls the image capture range of the image capture apparatus 100, by controlling the PTZ mechanism 201 based on the calculated PTZ control values.

The control unit 311 displays the UI window and the image received by the OF 210, on the display 215. The operation acceptance unit 312 acquires information about a user operation performed via an input device including a mouse and a keyboard.

Figure 4A:
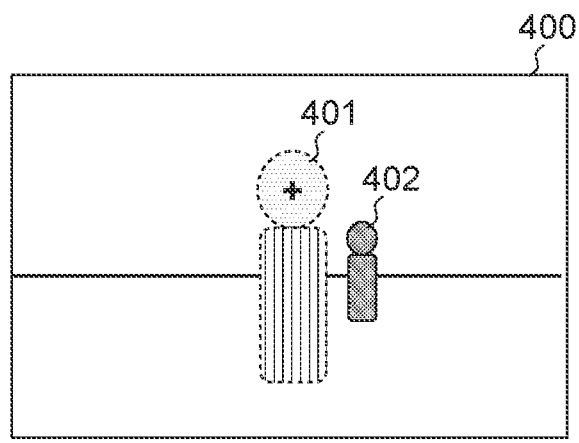
FIGS. 4A and 4B are diagrams each illustrating a user interface (UI) window.
Figure 4B:
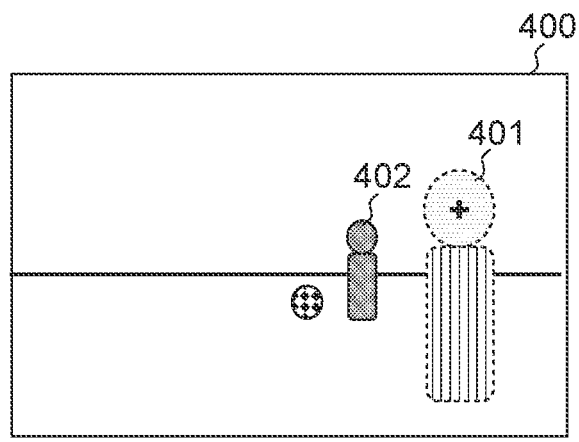
Figure 5A:
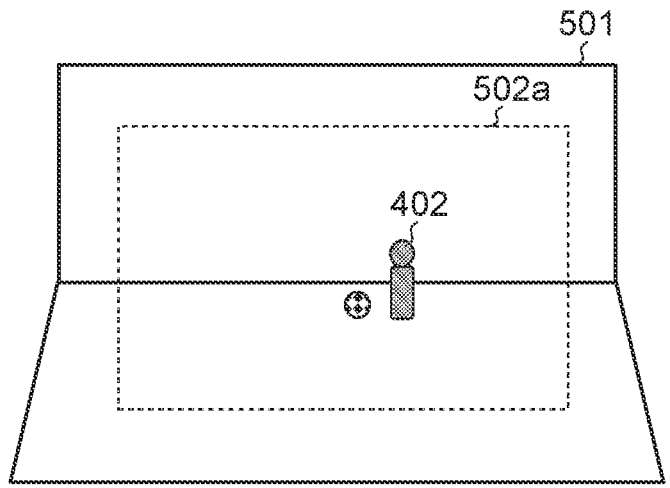
FIGS. 5A, 5B, and 5C are diagrams illustrating an automatic tracking function.
Figure 5B:
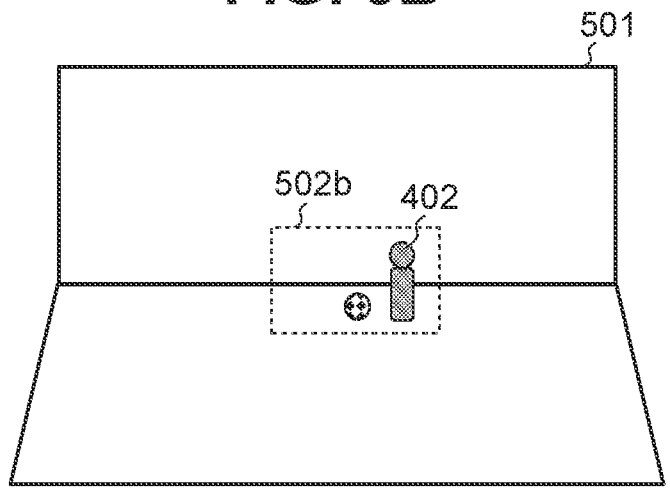
Figure 5C:
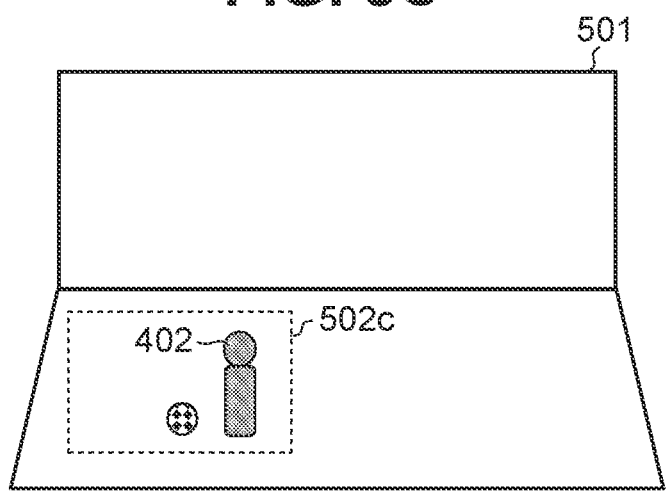

The UI window generated by the generation unit 302 in the present exemplary embodiment will be described with reference to FIGS. 4A and 4B. A UI window 400 illustrated in FIG. 4A is a graphical user interface (GUI) generated by the generation unit 302. The generation unit 302 generates the UI window 400 by superimposing an icon 401 corresponding to a target subject to be tracked on an image acquired by the image acquisition unit 301. The generation unit 302 may generate the UI window 400 by superimposing the icon 401 on a predetermined image corresponding to an image capture range of the imaging unit 200, instead of the image acquired by the image acquisition unit 301. The predetermined image is, for example, an image filled with a predetermined color, and is a rectangular image the same as the image capture range of the imaging unit 200 in terms of aspect ratio. In the example in FIG. 4A, a subject 402 is also included in the UI window 400, as the current tracking target. The UI window 400 generated by the generation unit 302 is transmitted to the client apparatus 110 via the I/F 202. The control unit 311 of the client apparatus 110 displays the received UI window 400 on the display 215. The user can change the position and the size of the icon 401 in the UI window 400 displayed on the display 215. FIG. 4B illustrates the UI window 400 after the position and the size of the icon are changed. The client apparatus 110 transmits, to the image capture apparatus 100, tracking setting parameters including information about the position and the size of the icon 401 after the change illustrated in FIG. 4B. The position of the icon 401 is indicated by coordinates (X,Y) (0≤X≤1920, 0≤Y≤1080) in the UI window 400, and the size of the icon 401 is indicated by an integer value such as S (1≤S≤10). The image capture apparatus 100 receives the tracking setting parameters including the information about the position and the size of the icon 401 after the change. In a case where setting values indicating the position and the size of the icon after the change do not indicate a high possibility that tracking is lost, the control unit 306 controls the pan/tilt/zoom to perform automatic tracking of the tracking target, based on the setting values. Specifically, the control unit 306 controls the pan/tilt so that the position of the subject 402 as the tracking target in the image is substantially identical to the position of the icon 401 with respect to the UI window 400 in FIG. 4B. In addition, the control unit 306 controls the zoom so that the size of the subject 402 as the tracking target in the image is substantially identical to the size of the icon 401 with respect to the UI window in FIG. 4B. For example, suppose the image capture apparatus 100, at first, picks up an image of an image capture range 502a in a certain image capture environment 501 as illustrated in FIG. 5A. Here, based on the position and the size of the icon 401 after the change indicated in the UI window 400 in FIG. 4B, the control unit 306 controls the pan/tilt/zoom so that the image capture range of the image capture apparatus 100 becomes an image capture range 502b in FIG. 5B. Further, even in a case where the subject 402 as the tracking target moves in the image capture environment 501 as illustrated in FIG. 5C, the control unit 306 controls the image capture range to synchronize with the movement of the subject 402 and to keep the composition of the icon in the UI window 400. The image capture range after the control is an image capture range 502c in FIG. 5C.

Figure 6:
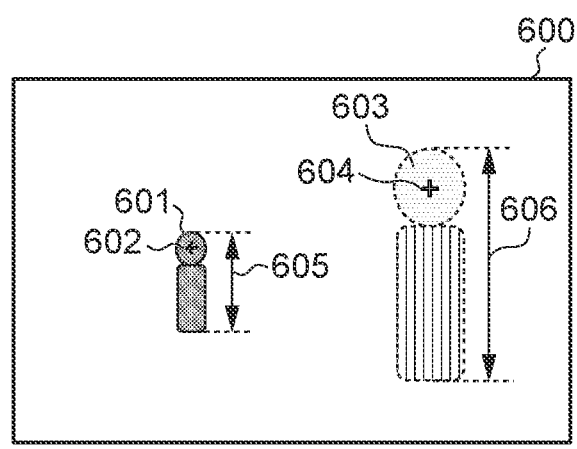
FIG. 6 is a diagram illustrating control of pan/tilt/zoom (PTZ).

The control of the pan/tilt/zoom (the calculation of the PTZ control values) during the execution of the automatic tracking function will be described more specifically with reference to FIG. 6. Suppose the position of a subject 601 appearing as a tracking target in an image 600 picked up by the imaging unit 200 is indicated by coordinates 602 (X',Y') representing the barycentric position of the head portion of the subject 601. In addition, suppose the position of an icon 603 operated by a user is indicated by coordinates 604 (X,Y). In this case, the control unit 306 calculates a value obtained by converting X-X' to a pan movement as a control value for the pan, and a value obtained by converting Y-Y' to a tilt movement as a control value for the tilt. In addition, in a case where a size 605 of the subject 601 in the image is H', and a size 606 of the icon 603 is Hs, the control unit 306 calculates a value obtained by converting Hs-H' into a zoom movement as a control value for the zoom. The PTZ control values (the control value for the pan, the control value for the tilt, and the control value for the zoom) are thus calculated. The control unit 306 controls the PTZ mechanism 201, based on the calculated PTZ control values, thereby controlling the pan, tilt, and zoom of the image capture apparatus 100 (i.e., controlling the image capture range).

Figure 7:
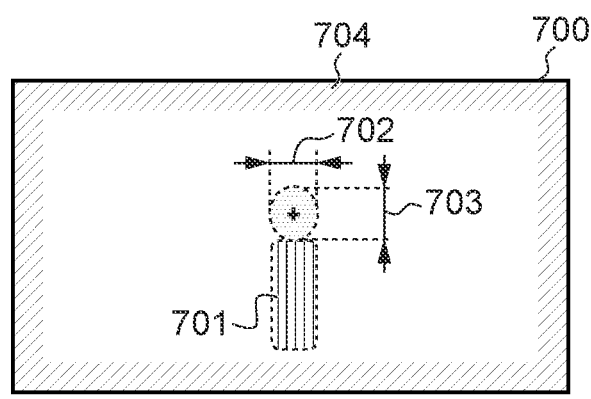
FIG. 7 is a diagram illustrating a tracking lost area.

Next, processing for correcting the position of the icon by the correction unit 304 will be described with reference to FIG. 7. FIG. 7 illustrates a UI window 700 including a currently set icon 701. Suppose the position of the icon 701 is (X,Y) (0≤X≤1920, 0≤Y≤1080), a vertical-width size of the icon 701 is S (1≤S≤10), a horizontal width 702 of the face portion of the icon 701 is Ws, and a vertical width 703 of the face portion of the icon 701 is Hs. Here, the correction unit 304 calculates a tracking lost area 704, which is a part of a captured image frame where the imaging unit cannot be tracked, based on the size of the currently set icon 701. The correction unit 304 in the present exemplary embodiment calculates the tracking lost area 704, based on, for example, the size of the face portion that is a part of the icon 701. Specifically, the correction unit 304 calculates an area obtained by combining an area over a distance Hs/2 from each of the upper side and the lower side of the UI window 700 and an area over a distance Ws/2 from each of the left side and the right side of the UI window 700, as the tracking lost area 704. The size of the tracking lost area 704 is a size to be changed depending on the size of the currently set icon 701 as described above. For example, in a case where the size of the icon 701 is increased by the user via the client apparatus 110, the parameter acquisition unit 303 acquires the size of the icon 701 after this change, and the correction unit 304 increases the size of the tracking lost area 704, based on the acquired size. On the other hand, in a case where the size of the icon 701 is decreased by the user via the client apparatus 110, the parameter acquisition unit 303 acquires the size of the icon 701 after this change, and the correction unit 304 decreases the size of the tracking lost area 704, based on the acquired size.

Figure 8A:
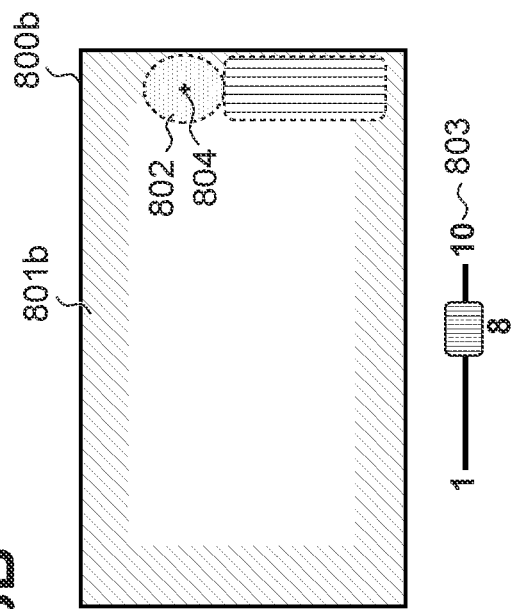
FIGS. 8A, 8B, and 8C are diagrams illustrating correction of the position of an icon.
Figure 8C:
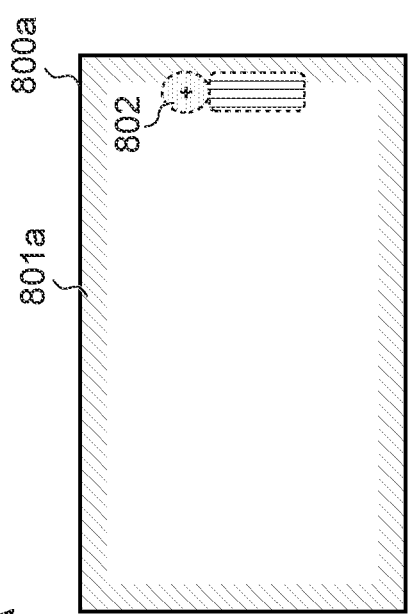
Figure 8B:
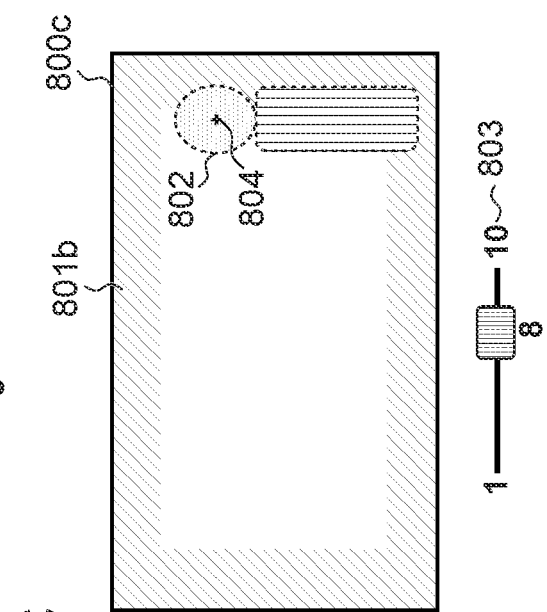

Here, suppose the position of the icon is operated by a user operation after the tracking lost area 704 is set by the correction unit 304, as will be described with reference to FIGS. 8A to 8C. FIG. 8A illustrates a UI window 800a including a tracking lost area 801a calculated by the correction unit 304 based on the size of a current icon 802. The UI window 800a is generated by the generation unit 302 and the generated UI window 800a is transmitted to the client apparatus 110. The control unit 311 of the client apparatus 110 displays the UI window 800a on the display 215. A slider 803 is a GUI generated by the generation unit 302, and the control unit 311 displays the slider 803 on the display 215, together with the UI window 800a. The user can change the size of the icon 802 by operating the bar of the slider 803. Here, suppose the slider 803 is changed by the user from a size "3" to a size "8" as illustrated in FIG. 8B, in a state where the UI window 800a and the slider 803 are displayed on the display 215. Then, the tracking setting parameters including information about the size after the change are transmitted from the client apparatus 110 to the image capture apparatus 100. Subsequently, the parameter acquisition unit 303 of the image capture apparatus 100 acquires the size of the icon 802 after the change, and the correction unit 304 updates the tracking lost area, based on the size after the change. A tracking lost area resulting from this update is a tracking lost area 801b of a UI window 800b in FIG. 8B. Because the size of the icon 802 is increased, the tracking lost area is updated to be increased accordingly. In this update, the correction unit 304 determines that a position 804 of the icon 802 after the change is included in the tracking lost area 801b as illustrated in FIG. 8B. In this case, the correction unit 304 moves the position 804 of the icon 802 leftward in the horizontal direction of the UI window 800b so that the position 804 of the icon 802 is not included in the tracking lost area 801b. A UI window 800c in FIG. 8C includes the icon 802 after the position 804 is moved by the correction unit 304. The generation unit 302 transmits information about the UI window 800c to the client apparatus 110, and the control unit 311 of the client apparatus 110 may display the UI window 800c on the display 215.

Figure 9:
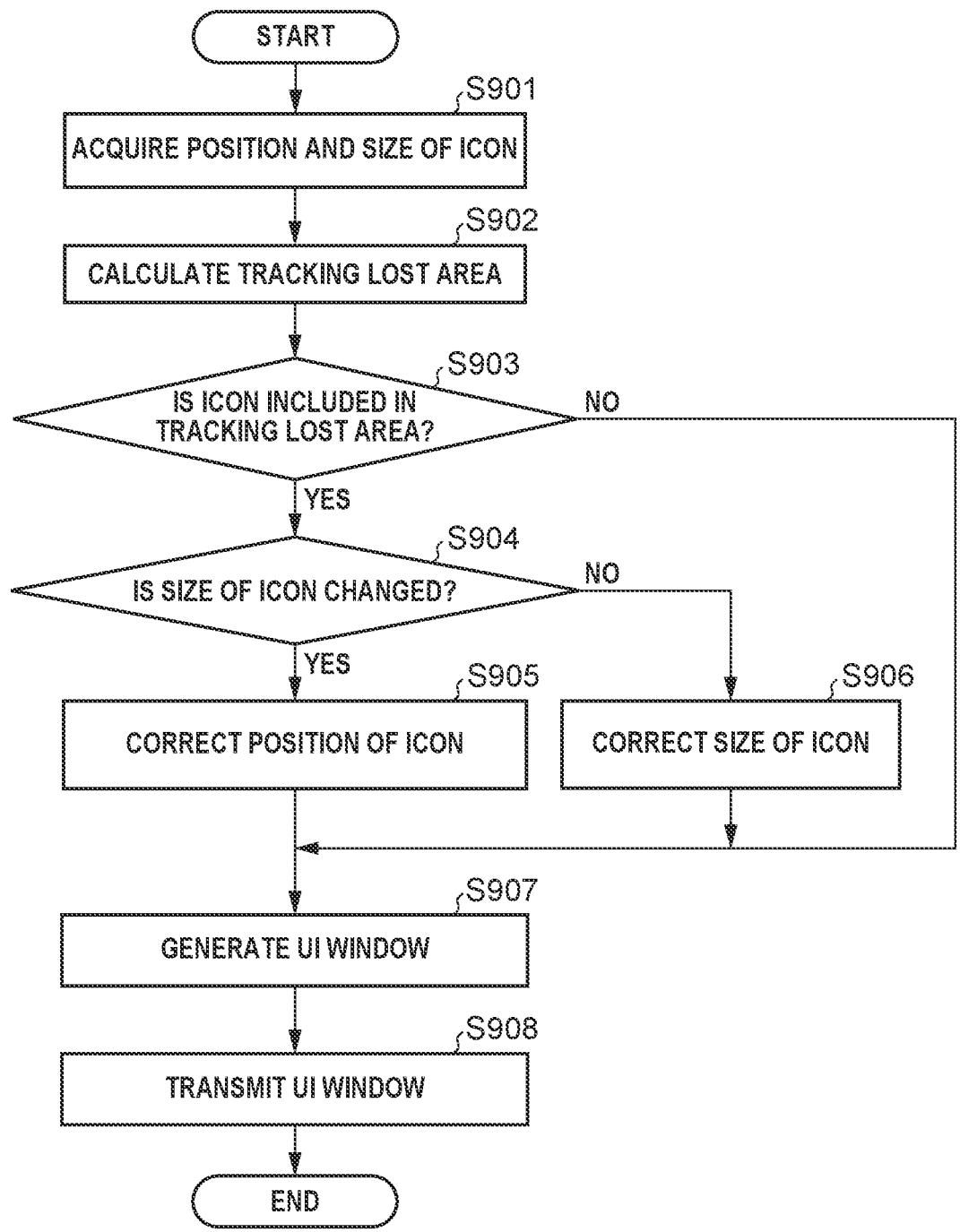
FIG. 9 is a flowchart illustrating a flow of processing for correcting the position of an icon.

Here, a flow of processing for correcting the position or size of an icon will be described with reference to a flow in FIG. 9. The CPU 203 of the image capture apparatus 100 executes a computer program stored in the ROM 205 of the image capture apparatus 100, so that the processing of the flow illustrated in FIG. 9 is implemented. The processing of the flow illustrated in FIG. 9 starts in response to receipt of the tracking setting parameters from the client apparatus 110 by the image capture apparatus 100.

First, in step S901, the parameter acquisition unit 303 acquires information about a position and a size of an icon designated by a user operation, from the tracking setting parameters received from the client apparatus 110 via the I/F 202.

Next, in step S902, the correction unit 304 calculates a tracking lost area, based on the size of the icon acquired by the parameter acquisition unit 303.

Next, in step S903, the correction unit 304 determines whether the position of the currently set icon is included in the calculated tracking lost area. For example, the correction unit 304 determines that the position of the icon is included in the tracking lost area in a case where the barycentric position of the head portion of the icon is included in the tracking lost area, and the correction unit 304 determines that the position of the icon is not included in the tracking lost area in a case where the barycentric position is not included in the tracking lost area. In a case where the correction unit 304 determines that the position of the currently set icon is not included in the tracking lost area (NO in step S903), the processing proceeds to step S907. In this case, in step S907, the generation unit 302 generates a UI window including the currently set icon and in which the display mode of the tracking lost area calculated in step S902 and the display mode of an area other than the tracking lost area are different. Subsequently, in step S908, the generation unit 302 transmits information about the generated UI window to the client apparatus 110 via the I/F 202. The control unit 311 of the client apparatus 110 then displays the generated UI window on the display 215.

In a case where the correction unit 304 determines that the position of the currently set icon is included in the tracking lost area (YES in step S903), the processing proceeds to step S904. In step S904, the correction unit 304 determines whether the size of the icon included in the tracking setting parameters acquired in step S901 is changed. For example, the correction unit 304 compares the previously set position and size of the icon with the new position and size of the icon set this time, and determines which one of the parameter of the position and the parameter of the size is changed. In a case where the correction unit 304 determines that the size of the icon is changed (YES in step S904), the processing proceeds to step S905. In a case where the correction unit 304 determines that the position of the icon is changed (NO in step S904), the processing proceeds to step S906. In the present exemplary embodiment, the current position and size of the icon are compared with the previous position and size of the icon, and in a case where the correction unit 304 determines that both of the position and the size of the icon are changed, the processing proceeds to step S905, but the processing may proceed to step S906, instead of proceeding to step S905.

In step S905, the correction unit 304 corrects the position of the icon, not the size of the icon, so that the position of the icon is not included in the tracking lost area calculated in step S902, as described with reference to FIGS. 8A to 8C. In this process, the position of the icon after the correction is, for example, a position which is not included in the tracking lost area, and at which the amount of the change from the original position of the icon is the smallest. In step S906, the correction unit 304 corrects the size of the icon so that the position of the icon is not included in the tracking lost area calculated in step S902. The size of the icon after this correction is a size with which the position of the icon is not included in the tracking lost area and the amount of the change from the original size of the icon is the smallest. The method of correcting the size of the icon in this process is a method of reducing the size to shrink the icon, without changing the position of the left-side vertex of the circumscribing rectangle of this icon. Therefore, when the size is changed, the position of the icon is also changed. In step S907 following step S905 or step S906, the generation unit 302 generates a UI window including the icon after the correction. In this process, the generation unit 302 also superimposes the tracking lost area calculated in step S902 on the UI window. The display mode of the tracking lost area superimposed on the UI window is different from the display mode of an area other than the tracking lost area. In step S908, the generation unit 302 transmits the generated UI window to the client apparatus 110 via the I/F 202. The control unit 311 of the client apparatus 110 displays this UI window on the display 215.

Figure 10:
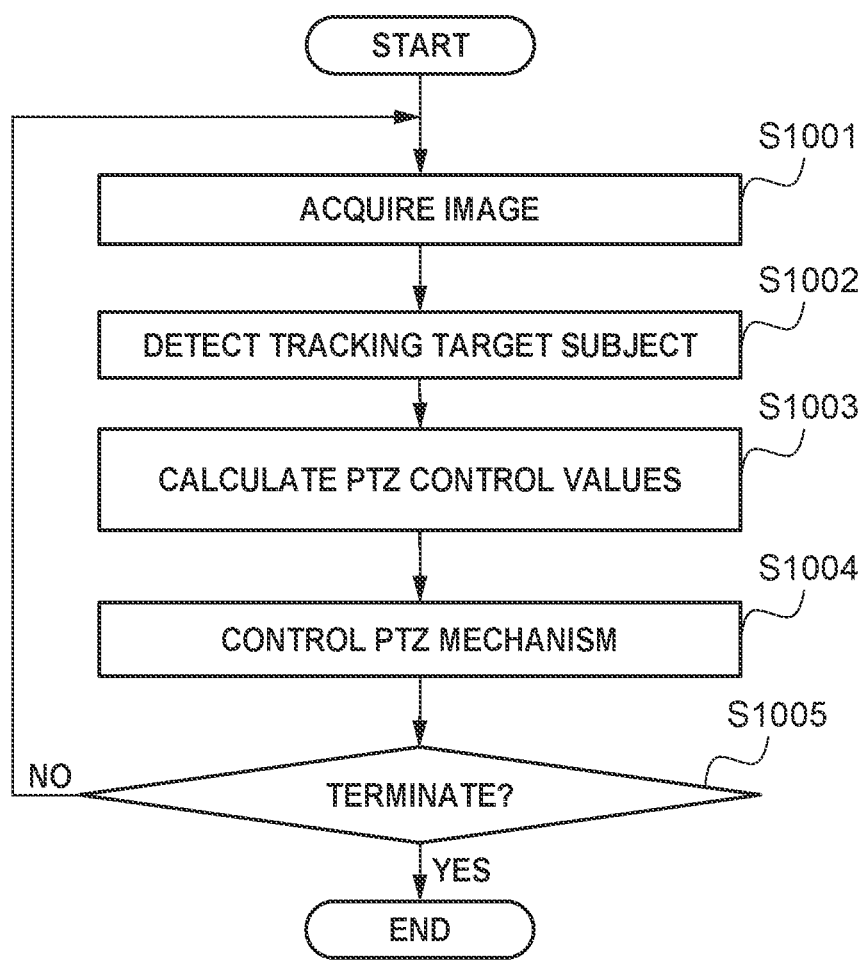
FIG. 10 is a flowchart illustrating a flow of processing of the automatic tracking function.

Next, processing of the automatic tracking by the image capture apparatus 100 of the present exemplary embodiment will be described with reference to processing of a flow illustrated in FIG. 10. The CPU 203 of the image capture apparatus 100 executes a computer program stored in the ROM 205 of the image capture apparatus 100, so that the processing of the flow illustrated in FIG. 10 is implemented.

First, in step S1001, the image acquisition unit 301 acquires an image picked up by the imaging unit 200. Next, in step S1002, the detection unit 305 detects a target subject to be tracked from the image acquired by the image acquisition unit 301. Next, in step S1003, the control unit 306 calculates PTZ control values, based on the position and the size of a currently set icon and the position and the size of the target subject to be tracked in the image detected by the detection unit 305. The calculation of the PTZ control values here is similar to the calculation described with reference to FIG. 6, and therefore will not be described. Next, in step S1004, the control unit 306 controls the PTZ mechanism 201 based on the calculated PTZ control values, thereby controlling the pan, tilt, and zoom of the image capture apparatus 100 (i.e., controlling the image capture range). Next, in step S1005, the control unit 306 determines whether to terminate the automatic tracking function. In a case where the control unit 306 determines to terminate the automatic tracking function (YES in step S1005), the processing of the flow in FIG. 10 ends. On the other hand, in a case where the control unit 306 determines not to terminate the automatic tracking function (NO in step S1005), the processing returns to step S1001, and the image acquisition unit 301 acquires the image of the next frame picked up by the imaging unit 200.

As described above, the image capture apparatus 100 in the present exemplary embodiment calculates the tracking lost area based on the size of the icon for determining the composition in automatically tracking the target subject to be tracked, and determines whether the position of the currently set icon is included in the calculated tracking lost area. Subsequently, in a case where the image capture apparatus 100 determines that the position of the icon is included in the tracking lost area, the image pickup apparatus 100 corrects the position or size of the icon so that the position of the icon is not included in this tracking lost area. This makes it possible to control the icon not to be located at the edge of the image pickup range, thereby making it possible to control the subject not to be located at the edge of the image pickup range during the automatic tracking. In other words, it is possible to reduce losing track of the subject. In general, losing track is more likely to occur in a case where the target subject to be tracked in the image is large than in a case where the target subject to be tracked in the image is small. Therefore, in the present exemplary embodiment, as compared with a case where the size of the icon for determining the composition during the automatic tracking is small, the tracking lost area is made large in a case where the size of the icon is large. This makes it easier to correct the position of the icon to be within the UI window and not to be included in the tracking lost area in a case where the size of the icon is large than in a case where the size of the icon is small, thereby also making it possible to reduce the occurrence of losing track.

In the first exemplary embodiment described above, in a case where the position of the icon designated by the user operation is included in the tracking lost area, the position or size of the icon is corrected. In a second exemplary embodiment, in a case where the position of an icon designated by a user operation is included in a tracking lost area, a predetermined warning for prompting change of the position or size of the icon is displayed. In the following, a part different from the first exemplary embodiment will be mainly described. Identical or similar components and processes in the respective exemplary embodiments will be assigned the same reference numerals, and the description thereof will not be repeated.

Figure 11:
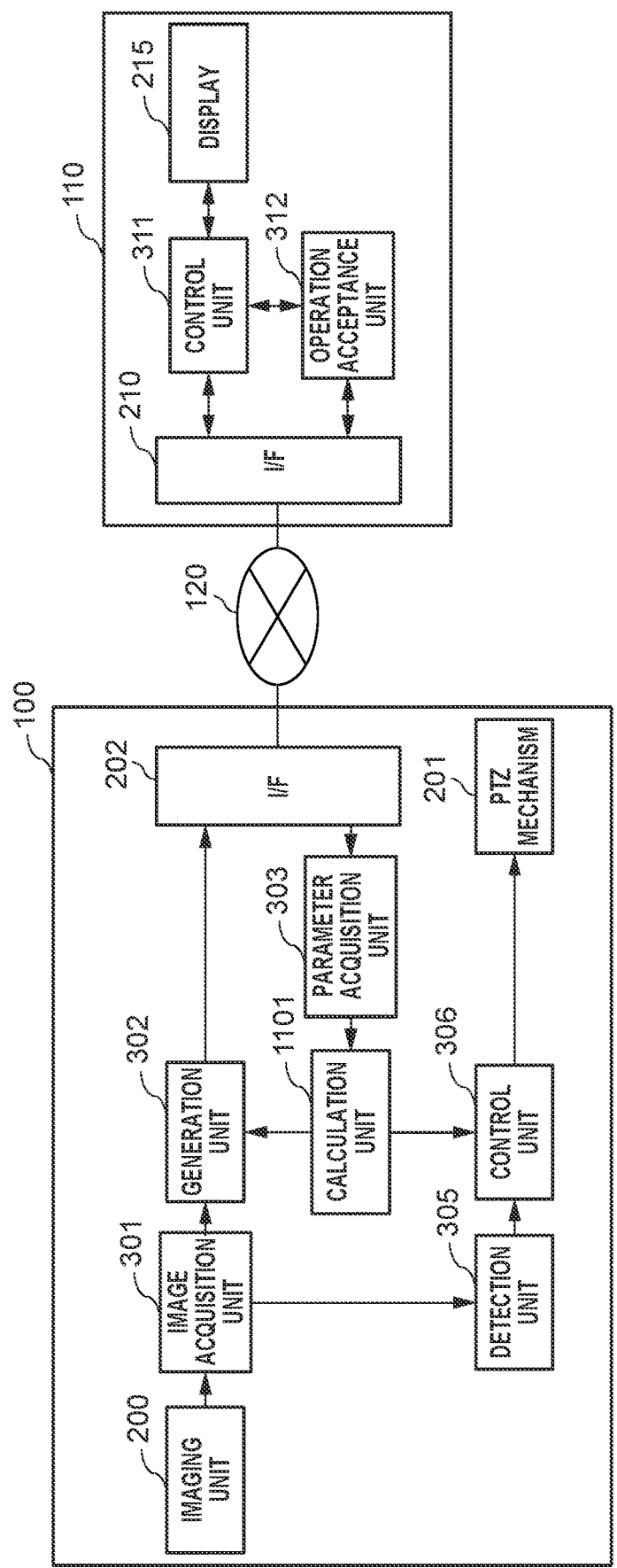
FIG. 11 is a diagram illustrating functional blocks of an image capture apparatus and a client apparatus.

Here, functional blocks of an image capture apparatus 100 and a client apparatus 110 in the second exemplary embodiment will be described with reference to FIG. 11. A point different from the functional blocks described with reference to FIG. 3 is that the image capture apparatus 100 includes a calculation unit 1101 in place of the correction unit 304.

The rest is similar to FIG. 3 and therefore will not be described. The CPU 203 of the image capture apparatus 100 executes a computer program stored in the ROM 205, so that the calculation unit 1101 is implemented, as with other functions represented by the image acquisition unit 301, the generation unit 302, the parameter acquisition unit 303, the correction unit 304, the detection unit 305, and the control unit 306.

The calculation unit 1101 in the present exemplary embodiment calculates a tracking lost area, based on the size of an icon, in a manner similar to the processing by the correction unit 304. The method of calculating the tracking lost area is similar to the processing by the correction unit 304 described with reference to some drawings including FIG. 7, and therefore will not be described. The calculation unit 1101 determines whether the position of a currently set icon is included in the calculated tracking lost area. Subsequently, the calculation unit 1101 displays the predetermined warning for prompting change of the position or size of the icon, in a case where the calculation unit 1101 determines that the position of the icon is included in the tracking lost area.

Figure 12A:
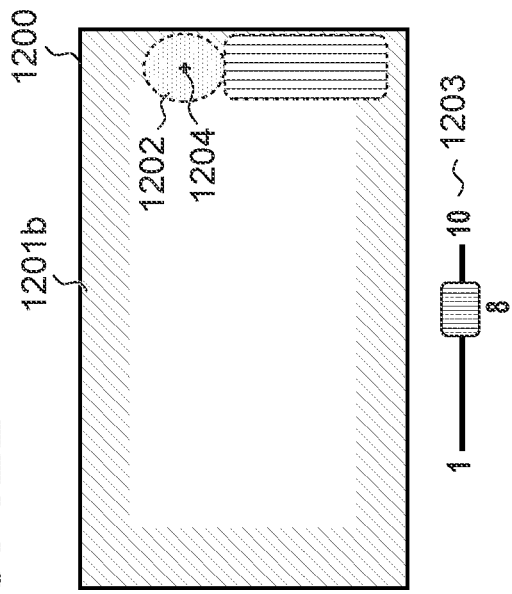
FIGS. 12A, 12B, and 12C are diagrams illustrating display of a warning.
Figure 12B:
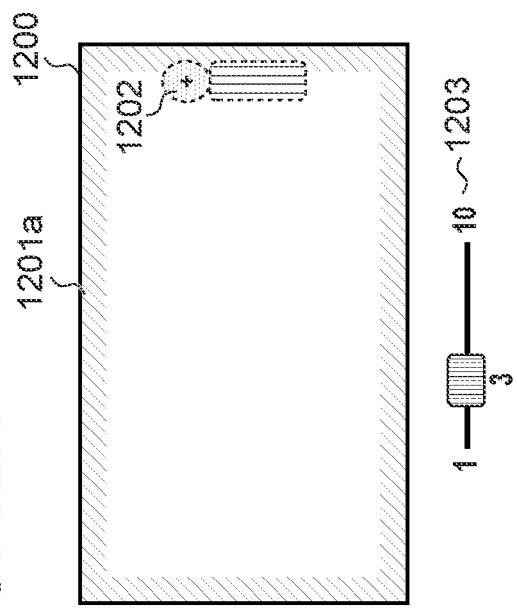
Figure 12C:
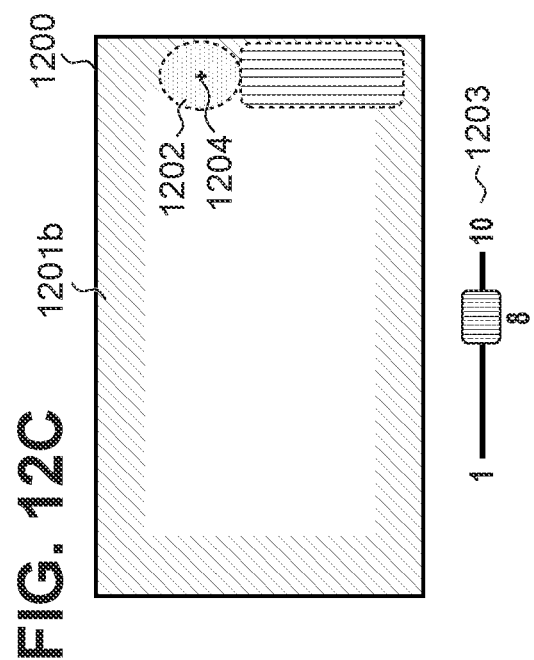

Processing by the image capture apparatus 100 in the present exemplary embodiment will be described with reference to FIGS. 12A to 12C. FIG. 12A illustrates a UI window 1200 including a currently set icon 1202. The UI window 1200 also indicates a tracking lost area 1201*a* calculated based on the size of the currently set icon 1202. After being generated by the generation unit 302, the UI window 1200 illustrated in FIG. 12A is transmitted to the client apparatus 110, and the control unit 311 of the client apparatus 110 displays the UI window 1200 on the display 215. A slider 1203 is a GUI generated by the generation unit 302, and the control unit 311 displays the slider 1203 on the display 215, together with the UI window 1200. A user can change the size of the icon 1202 by operating the bar of the slider 1203. Here, suppose the slider 1203 is changed by the user from a size "3" to a size "8" as illustrated in FIG. 12B, in a state where the UI window 1200 and the slider 1203 are displayed on the display 215. Then, tracking setting parameters including information about the size after the change are transmitted from the client apparatus 110 to the image capture apparatus 100. Subsequently, the parameter acquisition unit 303 of the image capture apparatus 100 acquires the size of the icon 1202 after the change, and the calculation unit 1101 updates the tracking lost area based on this size after the change. A tracking lost area resulting from this update is a tracking lost area 1201*b* illustrated in FIG. 12B. Because the size of the icon 1202 is increased, the tracking lost area is updated to be increased accordingly. In this update, the calculation unit 1101 determines that a position 1204 of the icon 1202 after the change is included in the tracking lost area 1201*b* as illustrated in FIG. 12B. In this case, the generation unit 302 generates information about the predetermined warning for prompting change of the position or the size of the icon 1202, based on the result of the determination by the calculation unit 1101. In the example illustrated in FIG. 12C, the generation unit 302 generates a warning message 1208 as the information about the predetermined warning for prompting change of the position of the icon 1202, and transmits the warning message 1208 to the client apparatus 110, together with the UI window 1200. The control unit 311 of the client apparatus 110 displays the UI window 1200 and the warning message 1208, on the display 215. The information about the predetermined warning is not limited to the warning message 1208, and, for example, a symbol indicating a warning such as an exclamation mark may be used. In this case, the generation unit 302 generates the symbol, and transmits the generated symbol to the client apparatus 110. The control unit 311 of the client apparatus 110 displays the UI window 1200 and the symbol, on the display 215.

A flow of processing for generating the warning for display will be described with reference to a flow in FIG. 13.

The CPU 203 of the image capture apparatus 100 executes a computer program stored in the ROM 205 of the image capture apparatus 100, so that the processing of the flow illustrated in FIG. 13 is implemented. The processing of the flow illustrated in FIG. 13 starts in response to receipt of the tracking setting parameters from the client apparatus 110 by the image capture apparatus 100.

First, in step S1301, the parameter acquisition unit 303 acquires information about a position and a size of an icon designated by a user operation, from the tracking setting parameters received from the client apparatus 110 via the I/F 202.

Next, in step S1302, the calculation unit 1101 calculates a tracking lost area, based on the size of the icon acquired by the parameter acquisition unit 303.

Next, in step S1303, the calculation unit 1101 determines whether the position of the currently set icon is included in the calculated tracking lost area. For example, the calculation unit 1101 determines that the position of the icon is included in the tracking lost area in a case where the barycentric position of the head portion of the icon is included in the tracking lost area, and the calculation unit 1101 determines that the position of the icon is not included in the tracking lost area in a case where the barycentric position is not included in the tracking lost area. In a case where the calculation unit 1101 determines that the position of the currently set icon is not included in the tracking lost area (NO in step S1303), the processing proceeds to step S1305. In this case, in step S1305, the generation unit 302 generates a UI window in which the display mode of the tracking lost area calculated in step S1302 and the display mode of an area other than the tracking lost area are different, and which includes the currently set icon. Subsequently, in step S1306, the generation unit 302 transmits information about the generated UI window to the client apparatus 110 via the I/F 202. The control unit 311 of the client apparatus 110 then displays the generated UI window on the display 215.

In a case where the calculation unit 1101 determines that the position of the currently set icon is included in the tracking lost area (YES in step S1303), the processing proceeds to step S1304. In step S1304, the generation unit 302 generates information about a predetermined warning (e.g., a warning message) for prompting reset of the icon. Subsequently, in step S1305, the generation unit 302 generates a UI window including the currently set icon. In this process, the generation unit 302 also superimposes the tracking lost area calculated in step S1302 on the generated UI window. The display mode of the tracking lost area superimposed on the UI window is different from the display mode of an area other than the tracking lost area. In step S1306, the generation unit 302 transmits the information about the predetermined warning generated in step S1304 and the UI window generated in step S1305 to the client apparatus 110, via the OF 202. The control unit 311 of the client apparatus 110 displays the information about the predetermined warning and the UI window on the display 215.

As described above, in a case where the position of the currently set icon is included in the tracking lost area calculated based on the size of this icon, the image capture apparatus 100 in the present exemplary embodiment generates the information about the predetermined warning for prompting change of the setting of the icon. The image capture apparatus 100 transmits the information about the predetermined warning to the client apparatus 110, and the client apparatus 110 displays the predetermined warning on the display 215. This makes it possible to alert the user to the possibility that losing track can occur with the current setting of the icon, and also makes it possible to prompt the user to change the setting.

OTHER EXEMPLARY EMBODIMENTS

The present disclosure can also be implemented by processing for causing one or more processors to read and execute a program for implementing one or more functions of the above-described exemplary embodiments. The program may be supplied to a system or apparatus having a processor, via a network or a storage medium. The present disclosure can also be implemented by a circuit (for example, an application specific integrated circuit (ASIC)) that implements the one or more functions of the above-described exemplary embodiments.

While the present disclosure is described with the exemplary embodiments, the above-described exemplary embodiments are merely specific examples in implementing the present disclosure, and the technical scope of the present disclosure is not to be interpreted by these exemplary embodiments in a limited way. In other words, the present disclosure can be implemented in various forms without departing from the technical idea or the substantial characteristic thereof. For example, a combination of the exemplary embodiments is also included in the disclosure of the present specification.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2022-108514, filed Jul. 5, 2022, which is hereby incorporated by reference herein in its entirety.

What is claimed is:

1. An information processing apparatus comprising:
a memory storing instructions; and
a processor that, upon execution of the stored instructions, is configured to functions as:
a generation unit configured to generate a window that corresponds to an image capture range of an image capture unit and includes an icon to be used to determine a composition for tracking a target subject to be tracked; and
a control unit configured to control the image capture range of the image capture unit such that the target subject included in an image captured by the image capture unit is at a position corresponding to a position of the icon in the window; and
a correction unit configured to perform correction such that a position of an icon designated by a user in the generated window is not included in a tracking lost area that is calculated based on a size of the icon designated by the user.

2. The information processing apparatus according to claim 1, wherein the tracking lost area is calculated to increase the size of the tracking lost area as the size of the icon increases.

3. The information processing apparatus according to claim 1, wherein the generation unit generates the window on which the tracking lost area is superimposed.

4. An information processing apparatus comprising:
a memory storing instructions; and
a processor that, upon execution of the stored instructions, is configured to functions as:
an acquisition unit configured to acquire information about a position and a size of an icon to be used to determine a composition for tracking a target subject to be tracked; and
a generation unit configured to generate a window that corresponds to an image capture range of an image capture unit and includes the icon,
a control unit configured to control the image capture range of the image capture unit such that the target subject included in an image captured by the image capture unit is at a position corresponding to a position of the icon in the window
wherein, in a case where the position of the icon is included in a tracking lost area calculated based on the size of the icon, the generation unit generates information to be provided as a predetermined warning.

5. The information processing apparatus according to claim 4, wherein the tracking lost area is calculated to increase the size of the tracking lost area as the size of the icon increases.

6. The information processing apparatus according to claim 4, wherein the generation unit generates the window on which the tracking lost area is superimposed.

7. The information processing apparatus according to claim 4, wherein execution of the stored instructions further configures to processor to operate as a control unit configured to control the image capture range of the image capture unit to track the target subject to be tracked included in an image captured by the image capture unit based on the position and the size of the icon in the window.

8. The information processing apparatus according to claim 4, further comprising the image capture unit configured to capture an image.

9. An information processing method comprising:
generating a window that corresponds to an image capture range of an image capture unit and includes an icon to be used to determine a composition for tracking a target subject to be tracked;
controlling the image capture range of the image capture unit such that the target subject included in an image captured by the image capture unit is at a position corresponding to a position of the icon in the window; and
correcting, a position of an icon designated by a user in the generated window to not be in a tracking lost area that is calculated based on the size of the designated icon.

10. An information processing method comprising:
acquiring information about a position and a size of an icon to be used to determine a composition for tracking a target subject to be tracked; and
generating a window that corresponds to an image capture range of an image capture unit and includes the icon,
controlling the image capture range of the image capture unit such that the target subject included in an image captured by the image capture unit is at a position corresponding to a position of the icon in the window;
wherein, in a case where the position of the icon is included in a tracking lost area calculated based on the size of the icon, information to be provided as a predetermined warning is generated in generating the window.

11. A non-transitory computer-readable storage medium storing instructions that, when executed by a processor, configure a computer to function as:
a generation unit configured to generate a window that corresponds to an image capture range of an image capture unit and includes an icon to be used to determine a composition in tracking a target subject to be tracked;
a control unit configured to control the image capture range of the image capture unit such that the target subject included in an image captured by the image capture unit is at a position corresponding to a position of the icon in the window; and
a correction unit configured to correct, a position of an icon designated by a user in the generated window to not be in a tracking lost area that is calculated based on the size of the designated icon.

* * * * *